US008359792B1

(12) United States Patent
Atchley et al.

(10) Patent No.: US 8,359,792 B1
(45) Date of Patent: Jan. 29, 2013

(54) GUY ADAPTER HAVING NON-INTEGRAL PULLING EYE

(75) Inventors: Jacob C. Atchley, Columbia, MO (US); Kelly S. Hawkins, Centralia, MO (US); Tim Staelens, Columbia, MO (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 13/205,953

(22) Filed: Aug. 9, 2011

(51) Int. Cl.
*E04H 12/20* (2006.01)
(52) U.S. Cl. ............ 52/149; 29/897.3; 403/80; 294/132
(58) Field of Classification Search .................. 52/146,
52/149, 148, 155, 114, 124.2, 125.2, 125.5,
52/125.6; 403/80, 322.4; 248/925; 254/36;
135/118; 182/3, 45; 119/788–791; 294/132,
294/135, 136; 29/897.3
See application file for complete search history.

(56) References Cited

U.S. PATENT DOCUMENTS

| 202,895 | A | | 4/1878 | Turley | |
|---|---|---|---|---|---|
| 1,779,035 | A | * | 10/1930 | Dutton | 294/89 |
| 2,503,446 | A | | 4/1950 | MacLatchie | 248/524 |
| 2,942,313 | A | | 6/1960 | Petersen | |
| 2,962,129 | A | * | 11/1960 | Walton | 403/78 |
| 3,137,051 | A | | 6/1964 | Bethea, Jr. | |
| 3,350,820 | A | * | 11/1967 | Stonely | 52/29 |
| 3,402,518 | A | * | 9/1968 | Lettunich | 52/149 |
| 3,431,012 | A | * | 3/1969 | Eriksson et al. | 294/89 |
| 4,017,115 | A | * | 4/1977 | Holt et al. | 294/89 |
| 4,068,879 | A | * | 1/1978 | Torbet et al. | 294/89 |
| 4,079,983 | A | * | 3/1978 | Van Mastrigt | 294/89 |
| 4,179,151 | A | * | 12/1979 | Tye | 294/89 |
| RE31,131 | E | * | 1/1983 | Torbet et al. | 294/89 |
| 4,380,404 | A | | 4/1983 | Hall | |
| 4,512,121 | A | * | 4/1985 | Carydias et al. | 52/125.2 |
| 4,691,988 | A | | 9/1987 | Tremblay | |
| 5,003,929 | A | * | 4/1991 | Dean | 119/784 |
| 5,118,061 | A | * | 6/1992 | Byrne et al. | 248/231.9 |
| 5,122,007 | A | | 6/1992 | Smith | |
| 5,228,657 | A | | 7/1993 | Hall | |
| 5,287,944 | A | * | 2/1994 | Woodyard | 182/3 |
| 5,405,210 | A | | 4/1995 | Tsui | |
| 5,625,984 | A | * | 5/1997 | Chapman et al. | 52/166 |
| D391,694 | S | * | 3/1998 | Eichhorn | D30/153 |
| 5,730,407 | A | * | 3/1998 | Ostrobrod | 248/237 |
| 5,881,506 | A | * | 3/1999 | Chapman et al. | 52/166 |
| 5,979,599 | A | * | 11/1999 | Noles | 182/36 |
| 5,997,662 | A | * | 12/1999 | Norio | 148/319 |
| 6,109,578 | A | * | 8/2000 | Guthrie et al. | 248/231.9 |
| 6,237,540 | B1 | * | 5/2001 | Vandracsek | 119/795 |
| 6,939,186 | B1 | * | 9/2005 | Kuckes | 440/104 |
| 7,047,604 | B2 | * | 5/2006 | Axel | 24/599.1 |
| 7,364,016 | B2 | * | 4/2008 | Drummond | 182/3 |
| 8,191,680 | B2 | * | 6/2012 | McLaughlin et al. | 182/36 |
| 2009/0078500 | A1 | * | 3/2009 | Wydner et al. | 182/3 |

FOREIGN PATENT DOCUMENTS

JP 06307089 A * 11/1994

* cited by examiner

*Primary Examiner* — Robert Canfield
*Assistant Examiner* — Brent W Herring
(74) *Attorney, Agent, or Firm* — Marcus R. Mickney; Mark S. Bicks; Alfred N. Goodman

(57) ABSTRACT

A guy adapter includes a main body having first and second ends. A socket member is connected to the first end. An eye member is connected to the second end. A non-integral pulling eye is slidably mounted on the main body. The socket member is forged to the first end of the main body. A pulling eye is slidably disposed on the main body. The eye member is forged to the second end of the main body. Accordingly, the guy adapter is formed having a non-integral pulling eye slidably mounted thereon.

28 Claims, 6 Drawing Sheets

GUY ADAPTER HAVING NON-INTEGRAL PULLING EYE

FIELD OF THE INVENTION

The present invention relates to a guy adapter having a non-integral pulling eye. More particularly, the present invention relates to a guy adapter having a slidable pulling eye. Still more particularly, the present invention relates to a guy adapter having a pulling eye connected thereto prior to forging a second end of the guy adapter.

BACKGROUND OF THE INVENTION

A guy wire is a tensioned cable designed to add stability to structures, such as a utility pole. One end of the guy wire is connected to the structure, and the other end is connected to anchor secured to the ground at a distance from the structure's base.

To stabilize a utility pole, a hole is drilled through the pole. A bolt is passed through the hole and secured to the pole with a nut. A first end of the guy wire is connected to an eye of the bolt.

A guy adapter is connected to the anchor secured in the ground. A second end of the guy wire is connected to the guy adapter. A chain hoist connected to a pulling eye of the guy adapter is used to obtain a desired tension in the guy wire. Connection of the chain hoist to the pulling eye can be difficult because the pulling eye is fixed to the guy adapter such that the pulling eye is not slidable with respect to the guy adapter. Some existing guy adapters are bolted to the guy adapter, thereby preventing sliding movement of the pulling eye with respect to the guy adapter. Other existing guy adapters have a pulling eye that is integrally formed with the guy adapter as a single piece, thereby preventing any movement of the pulling eye with respect to the guy adapter. Accordingly, a need exists for a guy adapter having a non-integral pulling eye that is slidable with respect to the guy adapter.

SUMMARY OF THE INVENTION

Accordingly, a primary objective of the present invention is to provide an improved guy adapter having a non-integral pulling eye.

A further objective of the present invention is to provide a pulling eye for a guy adapter in which the pulling eye is slidable with respect to the guy adapter.

A still further objective of the present invention is to provide an improved guy adapter in which the pulling eye is connected thereto prior to forging the second end of the guy adapter.

The foregoing objectives are basically attained by a guy adapter having a main body having first and second ends. A socket member is connected to the first end. An eye member is connected to the second end. A non-integral pulling eye is slidably mounted on the main body, thereby facilitating connecting the pulling eye to a tensioning device.

The foregoing objectives are also basically attained by a method of forming a guy adapter. The main body is forged having first and second ends. A socket member is forged to the first end of the main body. A pulling eye is slidably mounted on the main body. An eye member is forged to the second end of the main body. Accordingly, a guy adapter is formed having a non-integral pulling eye slidably disposed thereon.

Other objects, advantages and salient features of the invention will become apparent from the following detailed description, which, taken in conjunction with the annexed drawings, discloses a preferred embodiment of the invention.

As used in this application, the terms "front," "rear," "upper," "lower," "upwardly," "downwardly," and other orientational descriptors are intended to facilitate the description of the guy adapter, and are not intended to limit the structure of the guy adapter to any particular position or orientation.

BRIEF DESCRIPTION OF THE DRAWINGS

The above aspects and features of the present invention will be more apparent from the description for an exemplary embodiment of the present invention taken with reference to the accompanying drawings, in which.

Throughout the drawings, like reference numerals will be understood to refer to like parts, components and structures.

DETAILED DESCRIPTION OF AN EXEMPLARY EMBODIMENT

Figure 1:
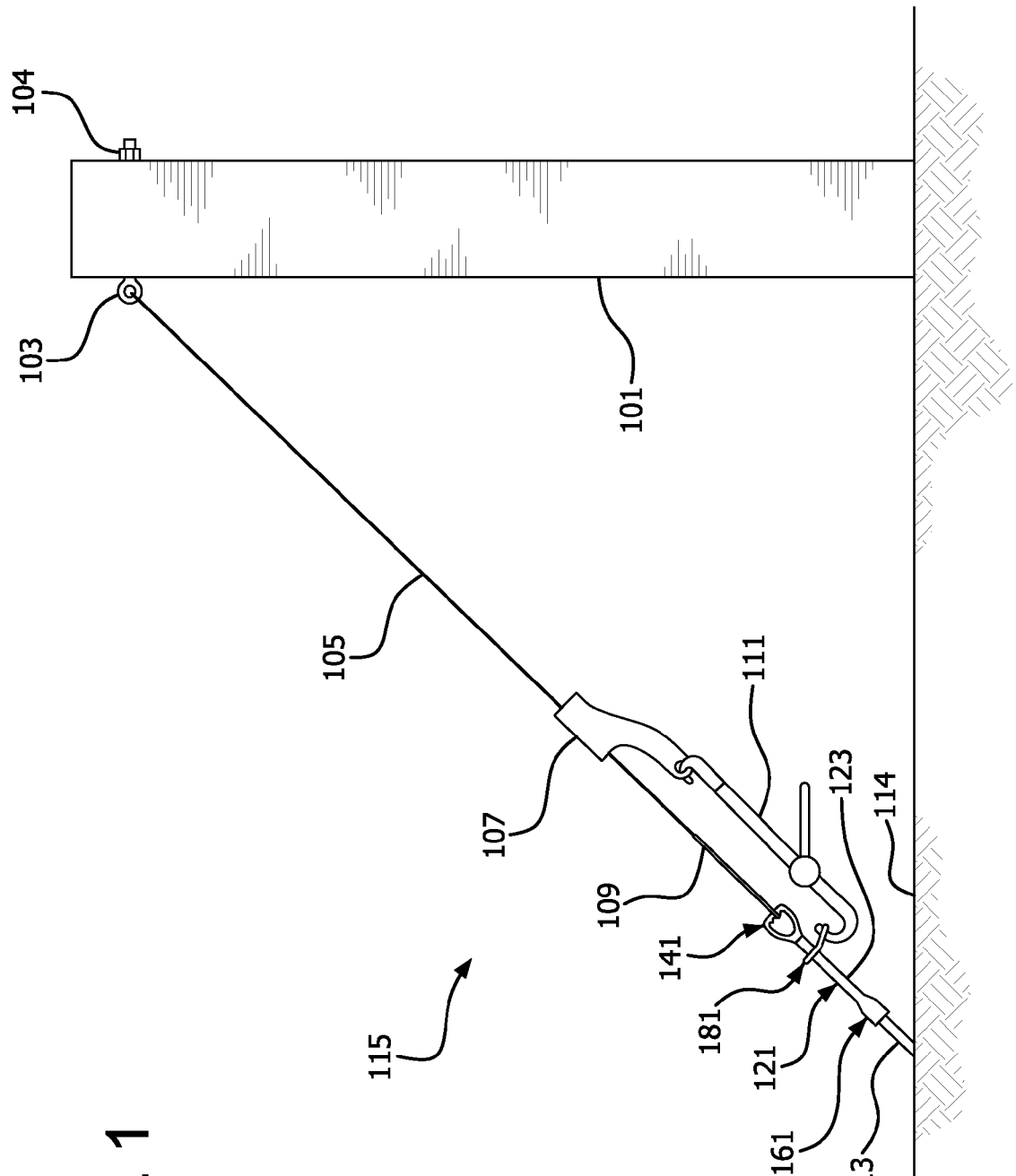
FIG. 1 is a side elevational view of a guy adapter securing a guy wire to an anchor in accordance with an exemplary embodiment of the present invention.

As shown in FIGS. 1-6, an exemplary embodiment of the present invention includes a guy adapter 121 for connecting a guy wire 105 to an anchor 113 to stabilize a utility pole 101. The guy adapter 121 includes a non-integral pulling eye 181. The pulling eye 181 can be connected to the guy adapter 121 prior to forging a second end of the guy adapter.

Figure 3:
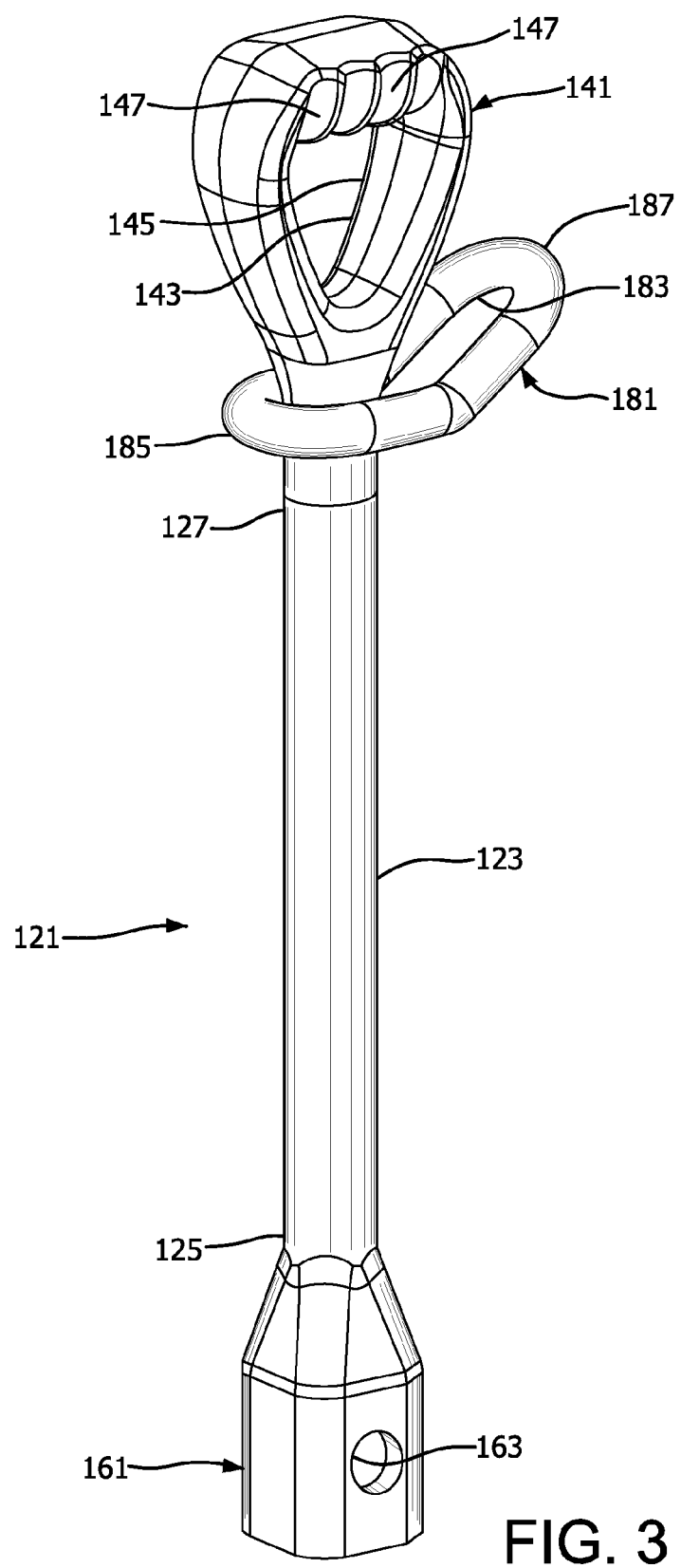
FIG. 3 is a perspective view of the guy adapter of FIG. 1.
Figure 4:
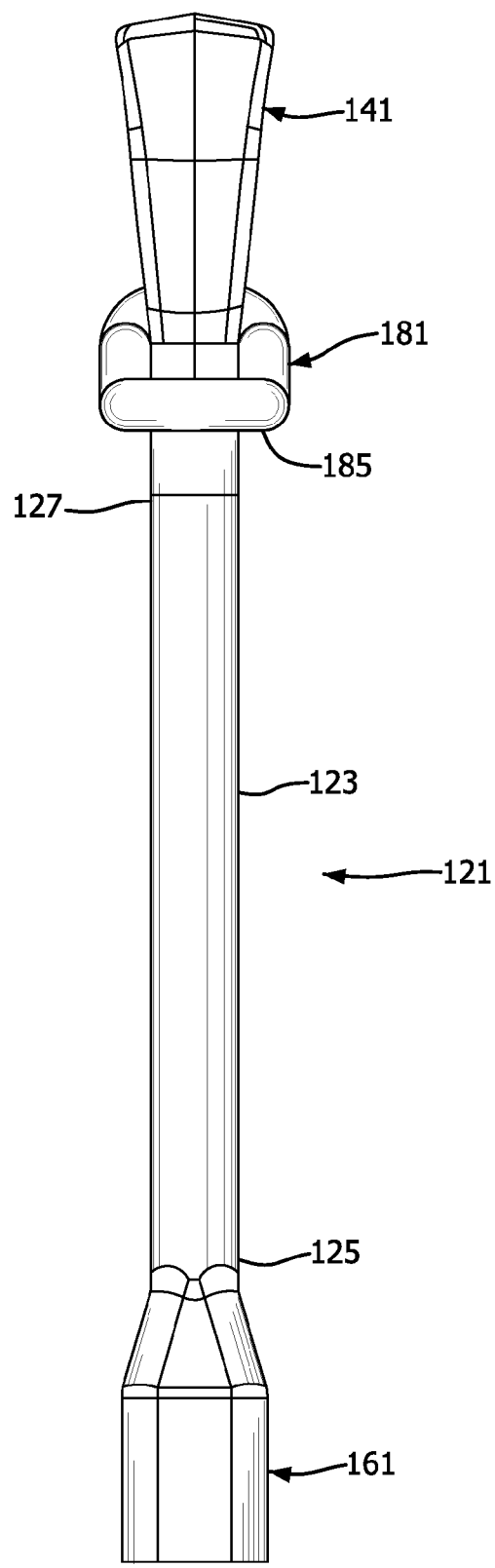
FIG. 4 is a front elevational view of the guy adapter of FIG. 3.

A guy adapter 121 in accordance with an exemplary embodiment of the present invention includes a main body 123 having a first end 125 and a second end 127, as shown in FIG. 3. An eye member 141 is connected to the second end 127 of the guy adapter 121. A socket member 161 is connected to the first end 125 of the guy adapter 121. Preferably, the guy adapter 121, including the eye member 141 and the socket member 161, is forged as a one-piece member, as explained hereafter. The guy adapter 121 is preferably forged steel.

Figure 5:
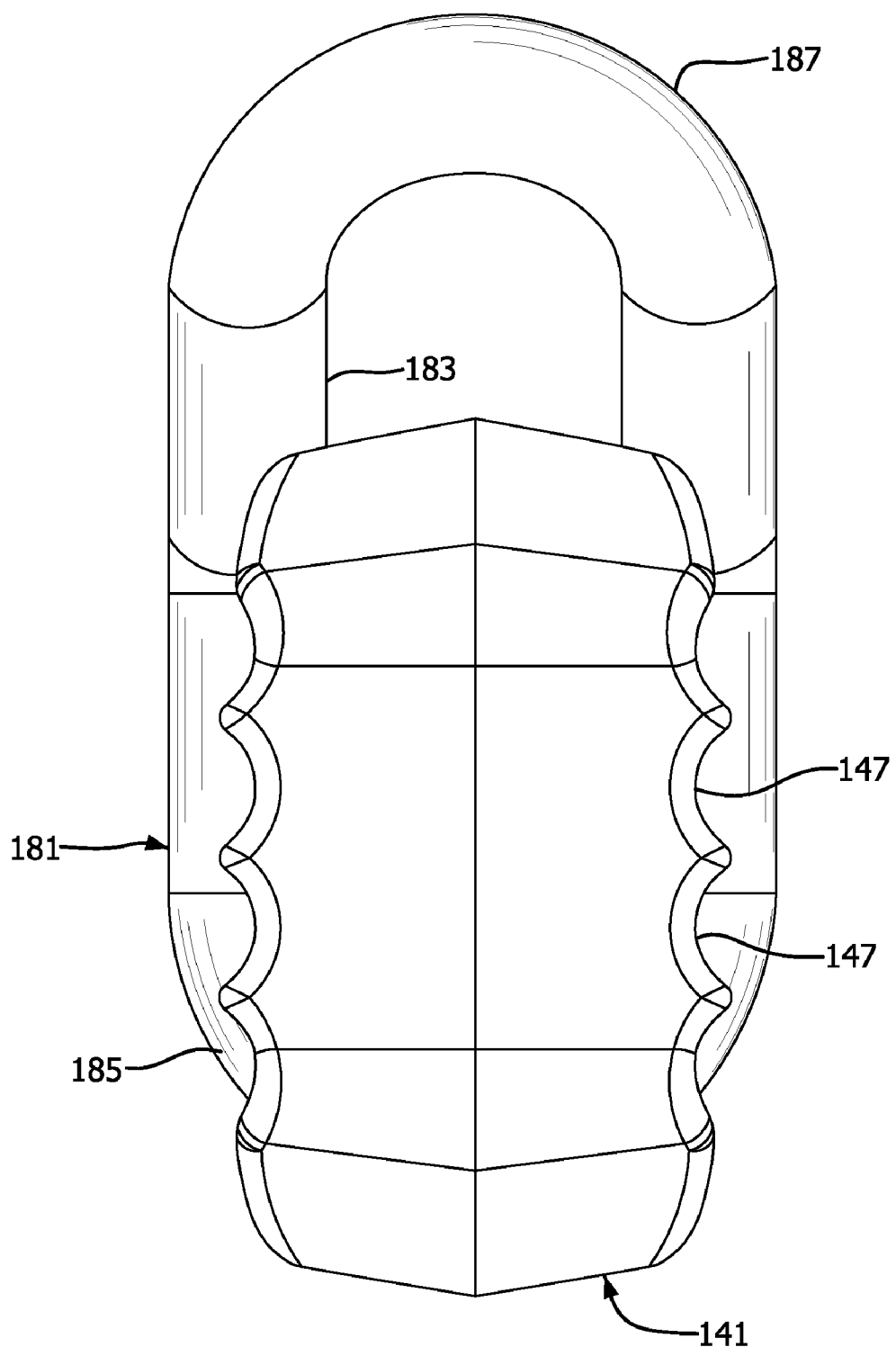
FIG. 5 is a top plan view of the guy adapter of FIG. 3.

The eye member 141 has an opening 143 for receiving a preformed guy grip. A plurality of retaining grooves 147 are formed on an inner surface 145 of the eye member 141 to receive strands of the preformed guy grip. As shown in FIGS. 3 and 5, four retaining grooves 147 are shown, although any suitable number may be used.

Figure 6:
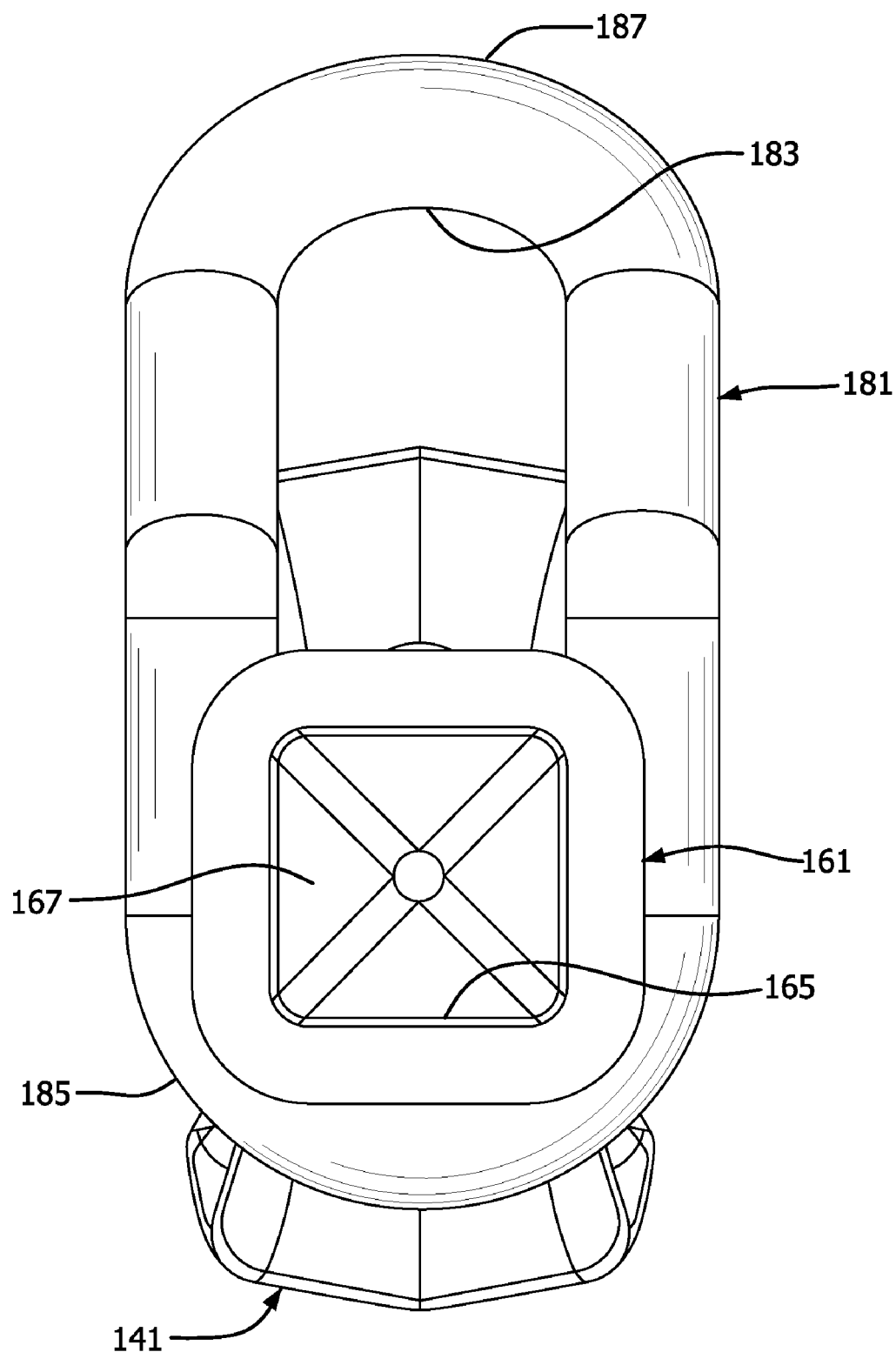
FIG. 6 is a bottom plan view of the guy adapter of FIG. 3.

The socket member 161 has a fastener opening 163 extending completely through the socket member 161 for receiving a fastener, as shown in FIG. 3. A socket opening 165 is formed in the socket member 161, as shown in FIG. 6, forming a cavity 167 in the socket member 161 for receiving an end of an anchor.

Figure 2:
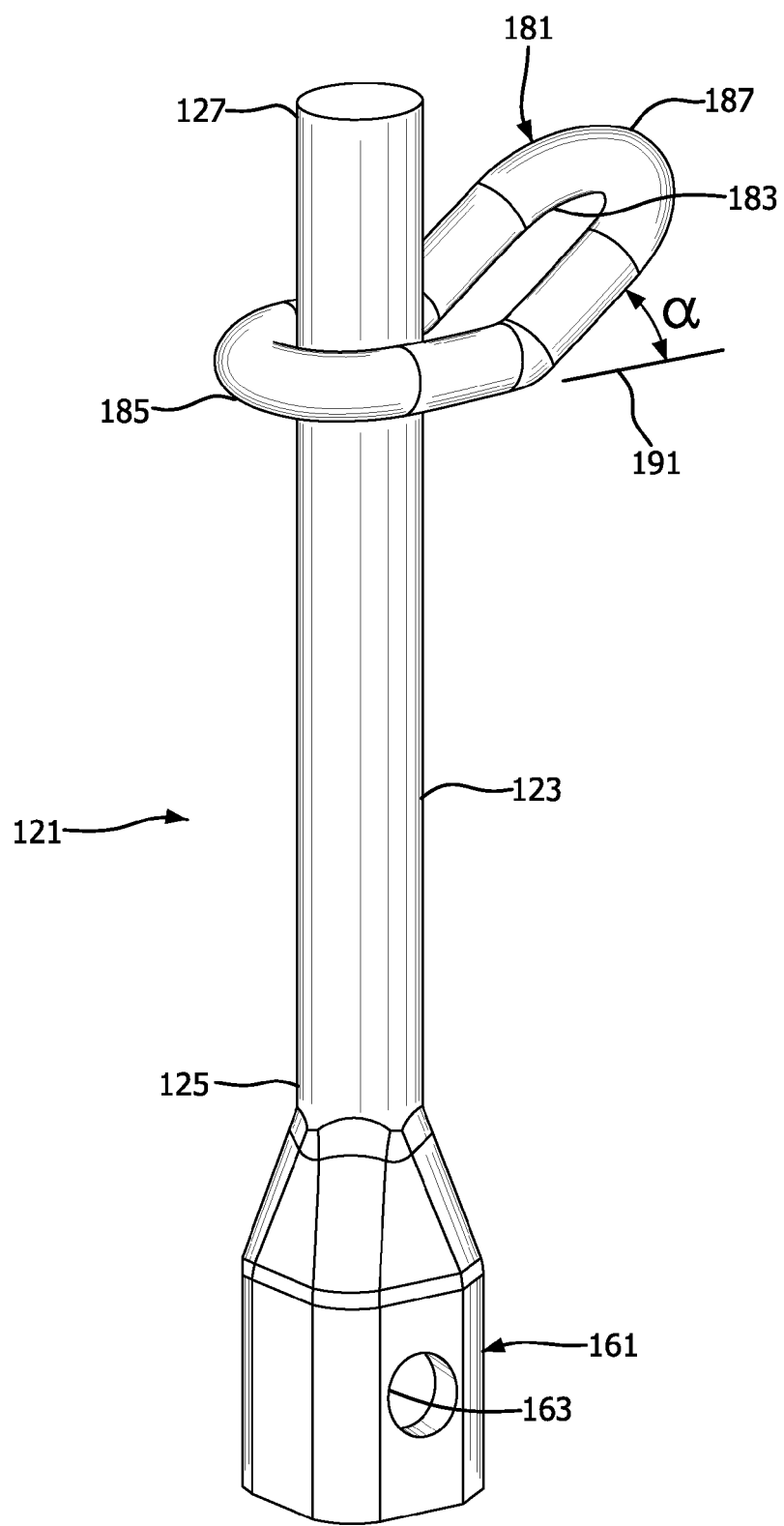
FIG. 2 is a perspective view of a guy adapter of FIG. 1 in which a pulling eye is connected thereto prior to forging a second end of the guy adapter.

A pulling eye 181 is slidably disposed or mounted on the main body 123 of the guy adapter 121, as shown in FIG. 3. The pulling eye 181 has a substantially oval shape, as shown in FIG. 6. An opening 183 is formed in the pulling eye 181 to receive the main body 123 of the guy adapter. The pulling eye 181 has a first portion 185 and a second portion 187. The second portion 187 is formed at an obtuse angle to the first portion 185, as shown in FIG. 2, to facilitate receiving a tensioning device, such as a chain hoist. An angle α of less than approximately 90 degrees is formed between the second portion 187 and a longitudinal axis 191 of the first portion 185, as shown in FIG. 2.

The pulling eye 181 is disposed on the main body 123 of the guy adapter 121 during the forging process. The main body 123 and the socket member 161 are forged, as shown in FIG. 2. The pulling eye 181 is then disposed on the main body 123 such that the pulling eye opening 183 receives the main body 123. The eye member 141 is then forged on the second end 127 of the main body, as shown in FIG. 3. The widths of the eye member 141 and the socket member 161 are larger than that of the pulling eye 181, as shown in FIGS. 5 and 6, such that the pulling eye 181 cannot be removed from the guy adapter 121 after the guy adapter has been completely forged. The width of the guy adapter opening 183 is larger than the diameter of the main body 123 such that the guy adapter is slidable along the main body.

As shown in FIG. 1, a guy wire assembly 115 provides stability for the utility pole 101. The guy wire assembly 115 includes a guy wire 105, a conventional cable clamp 107, a conventional preformed guy grip 109, a conventional chain hoist 111, a conventional anchor 113 and a guy adapter 121.

An eyebolt 103 is inserted through an opening in the utility pole 101 and secured thereto with a nut 104. A first end of the guy wire 105 is connected to the eyebolt. A cable clamp 107 is connected to the guy wire 105. An anchor 113 is inserted in the ground 114 at a desired angle and spaced from the base of the utility pole 101. The cavity 167 of the socket member 161 of the guy adapter 121 receives the end of the anchor 113. A chain hoist 111 is connected at one end to the cable clamp 107 and at the other end to the pulling eye 181 of the guy adapter. Connecting the chain hoist 111 to the pulling eye 181 is simplified because the pulling eye 181 is slidable on the main body 123 of the guy adapter 121. The chain hoist 111 is then ratcheted to obtain the desired tension in the guy wire 105. A preformed guy grip 109 is then connected between the eye member 141 of the guy adapter 121 and the cable clamp 107. The preformed guy grip 109 is passed through the opening 143 of the eye member 141 and the retaining grooves 147 facilitate reception of the strands of the preformed guy grip 109. The guy wire assembly 115 can be used with the guy wire assembly to stabilize other structures.

While an advantageous embodiment has been chosen to illustrate the invention, it will be understood by those skilled in the art that various changes and modifications may be made therein without departing from the scope of the invention as defined in the appended claims and their equivalents.

What is claimed is:

1. A guy adapter, comprising:
    a main body having first and second ends;
    a socket member connected to said first end;
    an eye member connected to said second end; and
    a non-integral pulling eye slidably mounted on said main body, said pulling eye having a first portion and a second portion, said second portion being angularly disposed with respect to said first portion, wherein said pulling eye is slidable on said main body between said socket member and said eye member.

2. The guy adapter according to claim 1, wherein
    said pulling eye is slidable around said main body.

3. The guy adapter according to claim 2, wherein
    said pulling eye has an opening receiving said main body.

4. The guy adapter according to claim 3, wherein
    said pulling eye opening has a first width less than cross-sectional dimensions of said socket member and said eye member preventing removal of said pulling eye from said main body.

5. The guy adapter according to claim 1, wherein
    said main body, said socket member and said eye member are formed as a single one-piece member.

6. The guy adapter according to claim 5, wherein
    said main body, said socket member and said eye member are formed of forged steel.

7. The guy adapter according to claim 1, wherein
    said socket member has a fastener opening to receive a fastener to secure said guy adapter to an anchor.

8. The guy adapter according to claim 7, wherein
    said socket member opening passes entirely through said socket member.

9. The guy adapter according to claim 1, wherein
    an obtuse angle is formed between said first and second portions of said pulling eye.

10. The guy adapter according to claim 1, wherein
    said pulling eye is formed of forged steel.

11. The guy adapter according to claim 1, wherein
    a plurality of retaining grooves are formed on an inner surface of said eye member to receive wire strands.

12. A method of forming a guy adapter, comprising the steps of
    forging a main body having first and second ends;
    forging a socket member to the first end of the main body;
    slidably disposing a pulling eye on the main body, the pulling eye having a second portion angularly disposed with respect to a first portion; and
    forging an eye member to the second end of the main body, wherein said pulling eye is slidable on said main body between said socket member and said eye member.

13. The method of forming a guy adapter according to claim 12, wherein
    the pulling eye is slidably disposed on the main body prior to forging the eye member to the second end of the main body.

14. The method of forming a guy adapter according to claim 13, wherein
    the pulling eye has an opening having a width less than cross-sectional dimensions of the socket member and the eye member to prevent removal of the pulling eye from the main body.

15. The method of forming a guy adapter according to claim 12, wherein
    the main body, the socket member and the eye member are forged as a one-piece member.

16. A guy adapter, comprising:
    a main body having first and second ends;
    a socket member connected to said first end;
    an eye member connected to said second end;
    a plurality of retaining grooves formed on an inner surface of said eye member to receive wire strands; and
    a non-integral pulling eye slidably mounted on said main body, wherein said pulling eye is slidable on said main body between said socket member and said eye member.

17. The guy adapter according to claim 16, wherein
    said pulling eye is slidable around said main body.

18. The guy adapter according to claim 17, wherein
    said pulling eye has an opening receiving said main body.

19. The guy adapter according to claim 18, wherein
    said pulling eye opening has a first width less than cross-sectional dimensions of said socket member and said eye member preventing removal of said pulling eye from said main body.

20. The guy adapter according to claim 16, wherein
said main body, said socket member and said eye member are formed as a single one-piece member.

21. The guy adapter according to claim 20, wherein
said main body, said socket member and said eye member are formed of forged steel.

22. The guy adapter according to claim 16, wherein
said socket member has a fastener opening to receive a fastener to secure said guy adapter to an anchor.

23. The guy adapter according to claim 22, wherein
said socket member opening passes entirely through said socket member.

24. The guy adapter according to claim 16, wherein
said pulling eye is formed of forged steel.

25. A method of forming a guy adapter, comprising the steps of
forging a main body having first and second ends;
forging a socket member to the first end of the main body;
slidably disposing a pulling eye on the main body; and
forging an eye member to the second end of the main body, an inner surface of the pulling eye having a plurality of retaining grooves formed thereon, wherein said pulling eye is slidable on said main body between said socket member and said eye member.

26. The method of forming a guy adapter according to claim 25, wherein
the pulling eye is slidably disposed on the main body prior to forging the eye member to the second end of the main body.

27. The method of forming a guy adapter according to claim 26, wherein
the pulling eye has an opening having a width less than cross-sectional dimensions of the socket member and the eye member to prevent removal of the pulling eye from the main body.

28. The method of forming a guy adapter according to claim 25, wherein
the main body, the socket member and the eye member are forged as a one-piece member.

\* \* \* \* \*